(12) United States Patent
Nishidate

(10) Patent No.: US 11,799,345 B2
(45) Date of Patent: Oct. 24, 2023

(54) STATOR AND BRUSHLESS MOTOR AND MOTOR ACTUATOR USING THE STATOR

(71) Applicant: Tokyo Parts Industrial Co., Ltd., Gunma-ken (JP)

(72) Inventor: Masahiro Nishidate, Gunma-ken (JP)

(73) Assignee: Tokyo Parts Industrial Co., Ltd.

( * ) Notice: Subject to any disclaimer, the term of this patent is extended or adjusted under 35 U.S.C. 154(b) by 128 days.

(21) Appl. No.: 17/348,964

(22) Filed: Jun. 16, 2021

(65) Prior Publication Data
US 2022/0029495 A1    Jan. 27, 2022

(30) Foreign Application Priority Data

Jul. 27, 2020 (JP) .................................. 2020-126699

(51) Int. Cl.
*H02K 3/52* (2006.01)
*H02K 7/116* (2006.01)
(52) U.S. Cl.
CPC ............. *H02K 3/522* (2013.01); *H02K 7/116* (2013.01); *H02K 2203/03* (2013.01)
(58) Field of Classification Search
CPC .... H02K 3/522; H02K 7/116; H02K 2203/03; H02K 3/345; H02K 11/30
See application file for complete search history.

(56) References Cited

U.S. PATENT DOCUMENTS

| 2003/0137295 A1* | 7/2003 | Akutsu | H02K 3/522 |
| | | | 324/207.25 |
| 2004/0245882 A1* | 12/2004 | Horie | H02K 3/522 |
| | | | 310/194 |
| 2008/0157610 A1* | 7/2008 | Watanabe | H02K 3/522 |
| | | | 310/43 |
| 2009/0127964 A1* | 5/2009 | Yumoto | H02K 3/522 |
| | | | 310/195 |
| 2010/0060092 A1* | 3/2010 | Blakesley | H02K 5/1677 |
| | | | 310/83 |

FOREIGN PATENT DOCUMENTS

| JP | 1995-143699 A | 6/1995 |
| JP | 1995-250445 A | 9/1995 |
| JP | 2001057013 A | 2/2001 |
| JP | 2012-170242 A | 9/2012 |
| JP | 2019-106778 A | 6/2019 |
| JP | 2020-078140 A | 5/2020 |

OTHER PUBLICATIONS

Machine translation of Fukuda [JP2012/170242] (Year: 2012).*

* cited by examiner

*Primary Examiner* — Bernard Rojas
(74) *Attorney, Agent, or Firm* — Jordan and Koda, PLLC

(57) ABSTRACT

A stator has a core, an insulating member that covers the core, windings that are wound around the insulating member, and conductive members that supply drive power to the windings. The conductive member has a joining part that contacts a lower surface of the insulating member, an insertion part that rises axially upward from one end of the joining part, and a board connection part that descends axially downward from the other end of the joining part. The insertion part penetrates through the insulating member and protrudes at the top of the stator, where it is connected to a coil end. The board connection part is fixed, by a method such as press-fitting, to a circuit board on which a Hall element or the like is mounted.

10 Claims, 12 Drawing Sheets

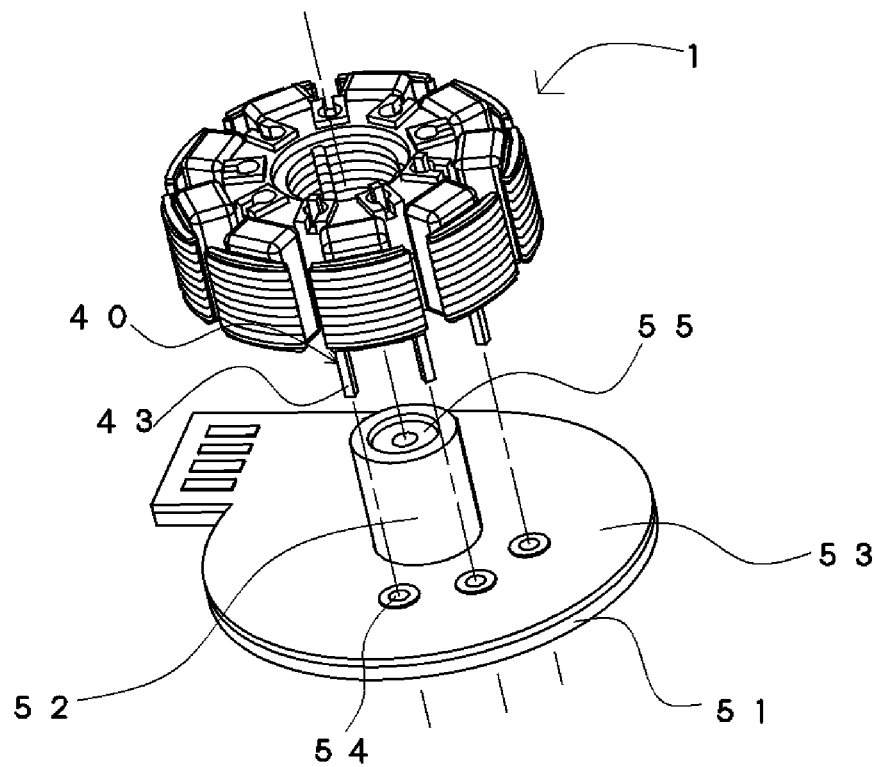
FIG. 6A
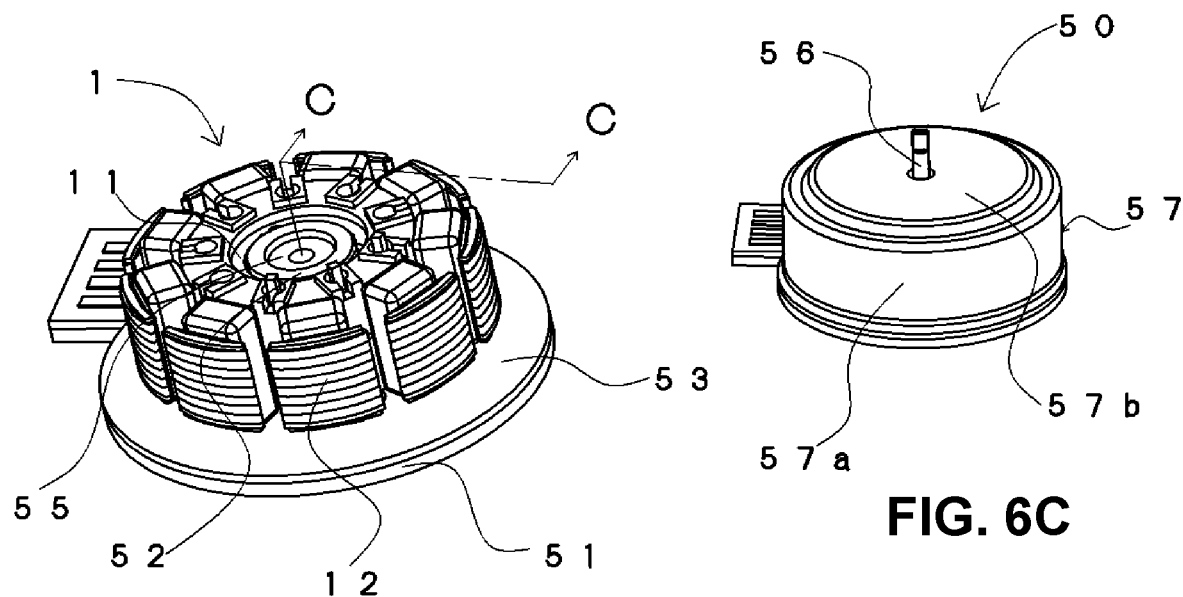
FIG. 6B
FIG. 6C

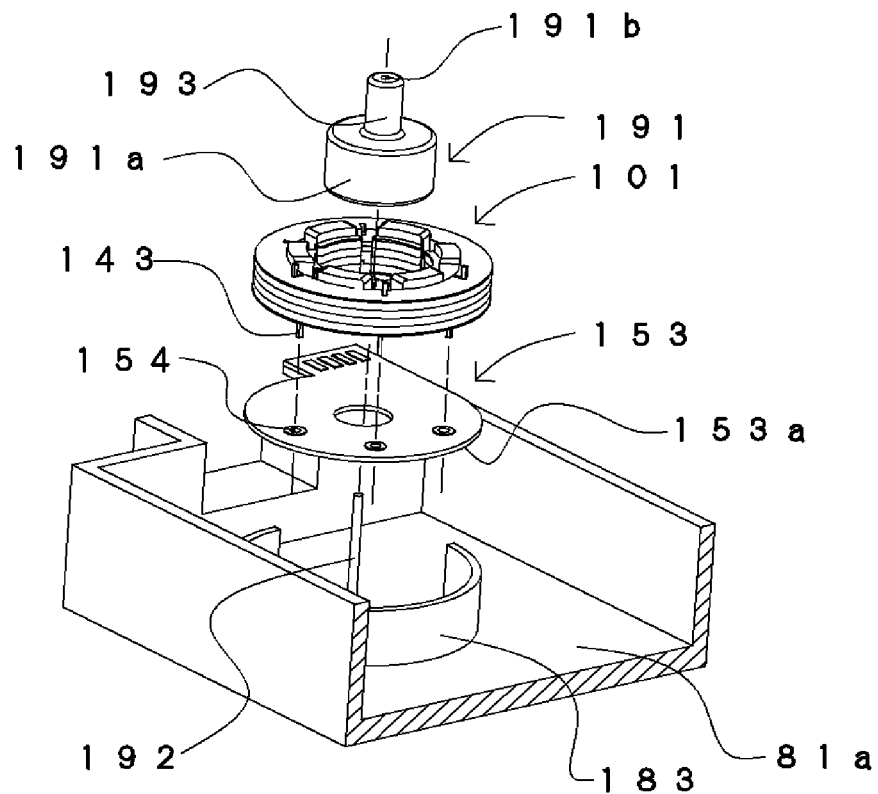
FIG. 11A
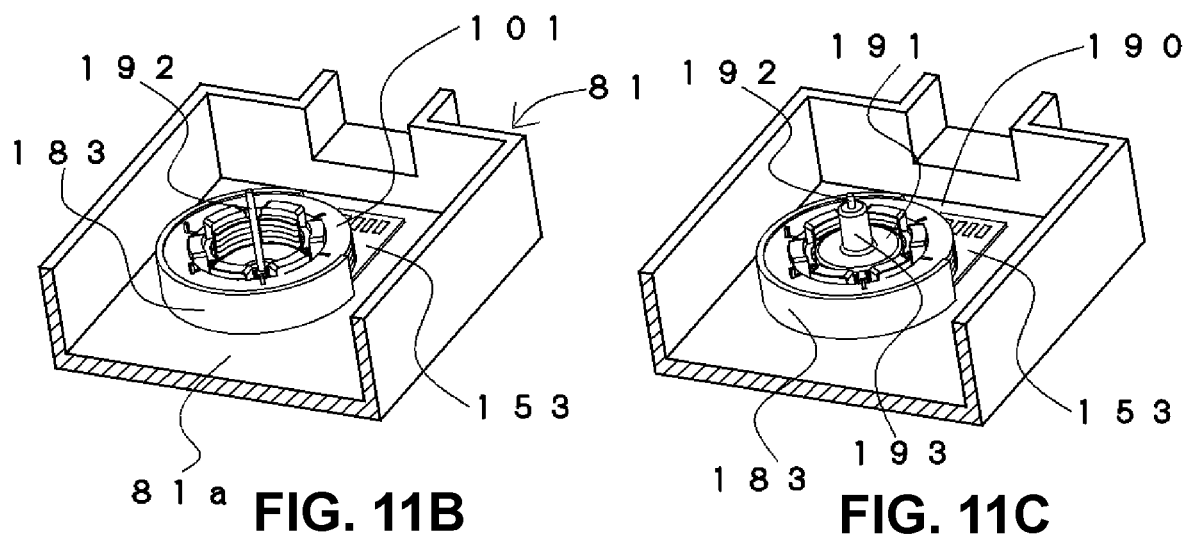
FIG. 11B  FIG. 11C

— PRIOR ART —

STATOR AND BRUSHLESS MOTOR AND MOTOR ACTUATOR USING THE STATOR

BACKGROUND OF THE INVENTION

The present invention relates to, for example, stators, brushless motors, and motor actuators.

Conventionally, brushless motors comprise a stator and a rotor rotated by a rotating magnetic field produced by the stator. As shown in FIG. 12, a stator 200 in a conventional brushless motor has a core 210 comprising a magnetic body and having radially extending pole teeth 211, a core cover 220 covering the core 210, windings 230 wound on the core cover 220, a winding end 231 being electrically connected by solder 262 to a land pattern 261 on a circuit board 260, which is provided on a stator base 250.

However, with decreases in motor size, the distance between the land pattern 261 and the windings 230 is being reduced, and the work of soldering the winding end 231 to the land pattern 261 is becoming more difficult. Furthermore, the heat from the soldering process could easily be transferred to the winding 230, which is almost directly thereabove, such that there was a risk of degrading the coating on the winding 230.

For example, in motors for automobiles, with a view to reliability, solder connections between the winding end 231 and the circuit board 260 tend to be avoided, and a more reliable connection method that does not use solder is considered to be necessary.

As a means for solving the aforementioned problem, the spindle motor described in Japanese Patent Laid-Open Publication No. 2001-057013 has, for example, been proposed. This spindle motor has a configuration in which an electrical connection member that relays the power supply to the coil is mounted on a coil assembly carrier so as to penetrate in the axial direction, the coil end being wound around one end of the electrical connection member, and the other end thereof extending downward from the coil assembly carrier so as to be brought into elastically pressing contact with a printed circuit board. With this configuration, the coil end and a circuit part on the printed circuit board can be reliably and quickly electrically connected, while the structure is simple and inexpensive.

A stopper is also provided on a part of the electrical connection member, which is in contact with the coil assembly carrier, so to limit the length over which this is inserted into the coil assembly carrier.

In the spindle motor shown in Japanese Patent Laid-Open Publication No. 2001-057013, whereas a laminated iron core, coils and electrical connection members are fixed thereon, the material of the coil assembly carrier is presumed to be an insulating resin. Thus, there was a problem in that, since insulating resin does not have the same mechanical strength as metallic materials, for example, if an excessive force is applied to the electrical connection member in the axial direction, the part that is in contact with the stopper in the coil assembly carrier will be deformed, and as a result, the axial position of the electrical connection member cannot be accurately maintained. Furthermore, there was a problem in that, since a rod-shaped conductor was used for the electrical connection member, if a rotational force was applied to the electrical connection member, the electrical connection member might unnecessarily rotate. There was concern that these problems could lead to failures, such as disconnection of the coil terminal and poor contact between the electrical connection member and the contact circuit portion.

SUMMARY OF THE INVENTION

One or more examples of the present invention provide a stator for a brushless motor that can prevent changes in the axial position of an electrical connection member, even when a large axial force is applied to the electrical connection member, and that can prevent the electrical connection member from unnecessarily rotating even when a rotational force is applied to the electrical connection member.

Furthermore, a brushless motor and a motor actuator are also provided, in which, employing the feature described above, connection is made by way of press-fitting between the electrical connection member provided in the stator and a through-hole in a circuit board.

Hereafter, aspects of the present invention directed to solving the problems described above are described. Note that, in the aspects described below, the components employed can be used in the most freely chosen combinations possible. Furthermore, the aspects and technical features of the present invention are not limited to those described hereafter, and are to be understood based on the description in the entire specification and the drawings, or based on the inventive ideas that can be grasped by the skilled artisan based on these descriptions.

One mode of embodiment of the stator of the present invention is a stator, which is a component of a brushless motor, and which generates a rotating magnetic field with respect to a rotor that can rotate around a central axis, wherein:

the stator has a core comprising a magnetic body, an insulating member that covers the core, a winding that is wound on the insulating member, and a conductive member for supplying drive power to the winding;

the conductive member comprises a joining part that is in contact with the lower surface of the insulating member, an insertion part that rises axially upward from one end of the joining part, and a board connection part descending axially downward from the other end of the joining part;

the insulating member has a penetrated part for penetration in the axial direction by the insertion part; and the insertion part is inserted into the penetrated part from below the insulating member, penetrates the penetrated part, and is electrically connected to the winding above the insulating member.

One mode of embodiment of the brushless motor of the present invention is a brushless motor comprising a stator, a rotor rotated by a rotating magnetic field produced by the stator, and a circuit board, wherein:

the stator has a core comprising a magnetic body, an insulating member that covers the core, a winding that is wound on the insulating member, and a conductive member for supplying drive power to the winding;

the conductive member comprises a joining part that is in contact with the lower surface of the insulating member, an insertion part that rises axially upward from one end of the joining part, and a board connection part descending axially downward from the other end of the joining part;

the insulating member has a penetrated part for penetration in the axial direction by the insertion part;

the insertion part is inserted into the penetrated part from below the insulating member, penetrates the penetrated part, and is electrically connected to the winding above the insulating member; and the board connection part is electrically connected to the circuit board.

One mode of embodiment of the motor actuator of the present invention is a motor actuator using a brushless motor according to the present invention, comprising the brushless motor of the present invention described above, a gear mechanism that transmits the rotational driving force of the brushless motor of the present invention while reducing the speed, and an output shaft that outputs the rotational driving force to the outside.

Furthermore, another mode of embodiment of the motor actuator of the present invention is a motor actuator that transmits rotational driving force of a motor while reducing the speed by way of a gear mechanism, and outputs the rotational driving force of the motor to the outside with an output shaft, wherein the motor actuator has a stator, a rotor that is supported coaxially with the stator and is rotated by a rotating magnetic field produced by the stator, a circuit board having a through-hole, a rotational support part that rotatably supports the rotor, a gear mechanism that transmits the rotational driving force of the rotor while reducing the speed, an output shaft that outputs the rotational driving force to the outside, and a case;

the stator has a core comprising a magnetic body, an insulating member that covers the core, a winding that is wound on the insulating member, and a conductive member for supplying drive power to the winding;

the conductive member comprises a joining part that is in contact with the lower surface of the insulating member, an insertion part that rises axially upward from one end of the joining part, and a board connection part descending axially downward from the other end of the joining part;

the insulating member has a penetrated part for penetration in the axial direction by the insertion part;

the insertion part is inserted into the penetrated part from below the insulating member, penetrates the penetrated part, and is electrically connected to the winding above the insulating member;

the stator is fixed in a stator retaining part that is provided on the case; and the board connection part and the circuit board are electrically connected by way of the through hole.

According to the present invention, a conductive member consisting of a joining part, an insertion part, and a board connection part is held so as to penetrate an insulating member, and by bringing the joining part into contact with the lower surface of the insulating member, the axial position of the conductive member can be made immobile, even if an excessive axially upward force is applied to the conductive member.

In addition to preventing disconnection of the winding terminal and poor contact between the conductive member and the circuit board, the connection to the circuit board can be made by press-fitting, which allows for connection without using solder, making it possible to make a highly reliable brushless motor and motor actuator.

BRIEF DESCRIPTION OF THE DRAWINGS

FIG. 1A and FIG. 1B show completion views of a stator, in a first exemplary mode of embodiment of the present invention, in which FIG. 1A is a perspective view from above and FIG. 1B is a perspective view from below.

FIG. 4A and FIG. 4B show completion views of a stator in a second exemplary mode of embodiment of the present invention, in which FIG. 4A is a perspective view from above and FIG. 4B is a perspective view from below.

FIG. 5A and FIG. 5B show schematic views of the stator in the second exemplary mode of embodiment of the present invention, in which FIG. 5A is a top view and FIG. 5B is a cross-sectional view at B-B.

FIG. 6A, FIG. 6B, and FIG. 6C show perspective views of a brushless motor in a third exemplary mode of embodiment of the present invention, in which FIG. 6A is a view of the stator assembly, FIG. 6B is a view of immediately after the stator is fixed, and FIG. 6C is a completion view.

FIG. 7A, FIG. 7B, and FIG. 7C show schematic views of a brushless motor in a third exemplary mode of embodiment of the present invention, in which FIG. 7A is a cross-sectional view at C-C in FIG. 6B, FIG. 7B and FIG. 7C are conceptual views showing the relationship between a through hole and a press-fitting part.

FIG. 8A and FIG. 8B show schematic views of a motor actuator in a fourth exemplary mode of embodiment of the present invention, in which FIG. 8A is a view in which a worm gear is used and FIG. 8B is a view in which a pinion gear is used.

FIG. 9A and FIG. 9B show schematic views of a motor actuator in a fifth exemplary mode of embodiment of the present invention, in which FIG. 9A is an exterior view, and FIG. 9B is a top view.

FIG. 10A, FIG. 10B, and FIG. 10C show perspective views of the assembly of the motor part of the motor actuator in the fifth exemplary mode of embodiment of the present invention, in which FIG. 10A is an assembly view, FIG. 10B is a view immediately after the stator and circuit board are fixed, and FIG. 10C is a completion view.

FIG. 11A, FIG. 11B, and FIG. 11C show perspective views of the assembly of the motor part of the motor actuator in the sixth exemplary mode of embodiment of the present invention, in which FIG. 11A is an assembly view, FIG. 11B is a view immediately after the stator and circuit board are fixed, and FIG. 11C is a completion view.

DETAILED DESCRIPTION OF THE PREFERRED EMBODIMENTS

Figure 3:
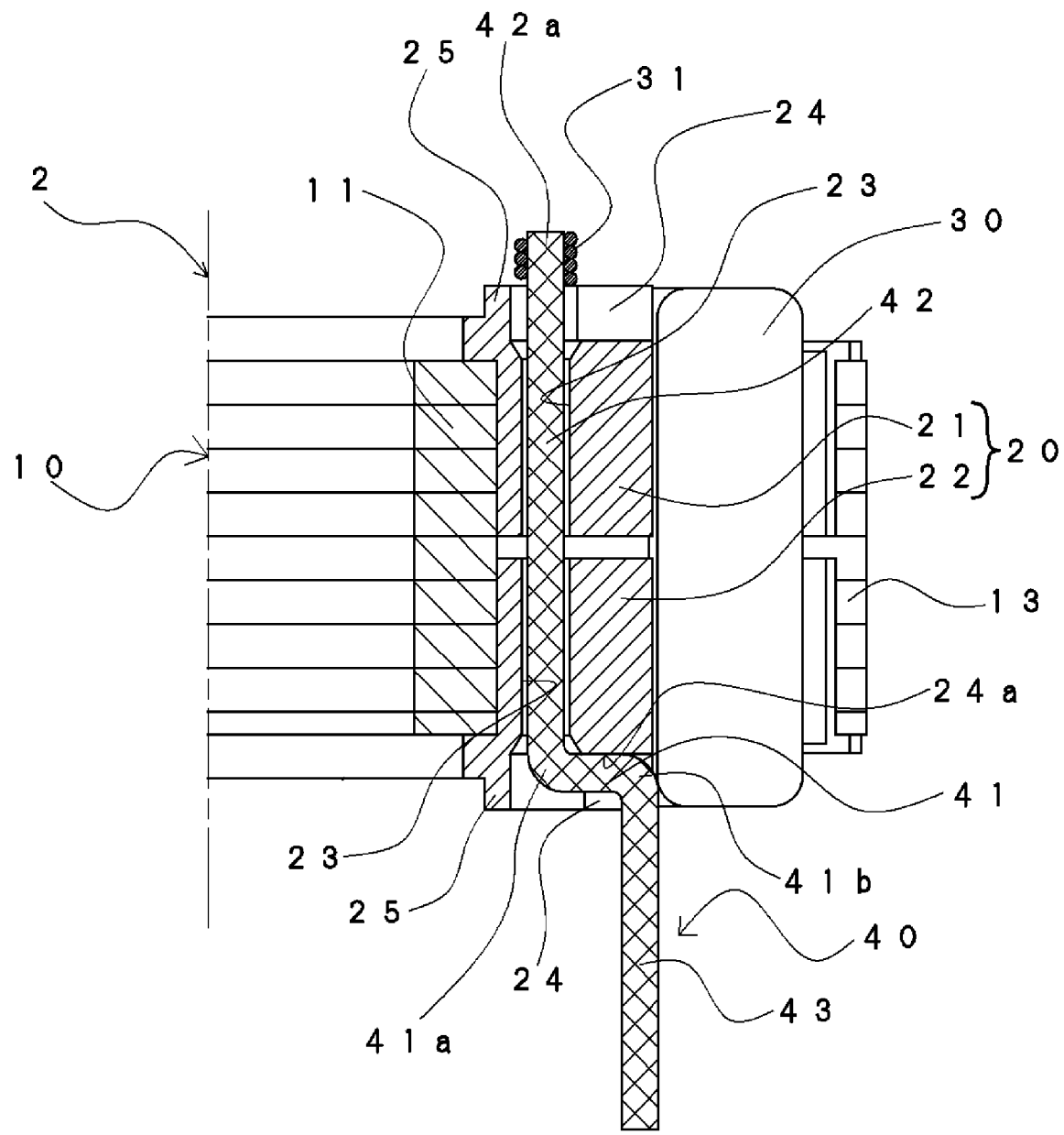
FIG. 3 is a cross-sectional view at A-A in FIG. 2.
Figure 4A:
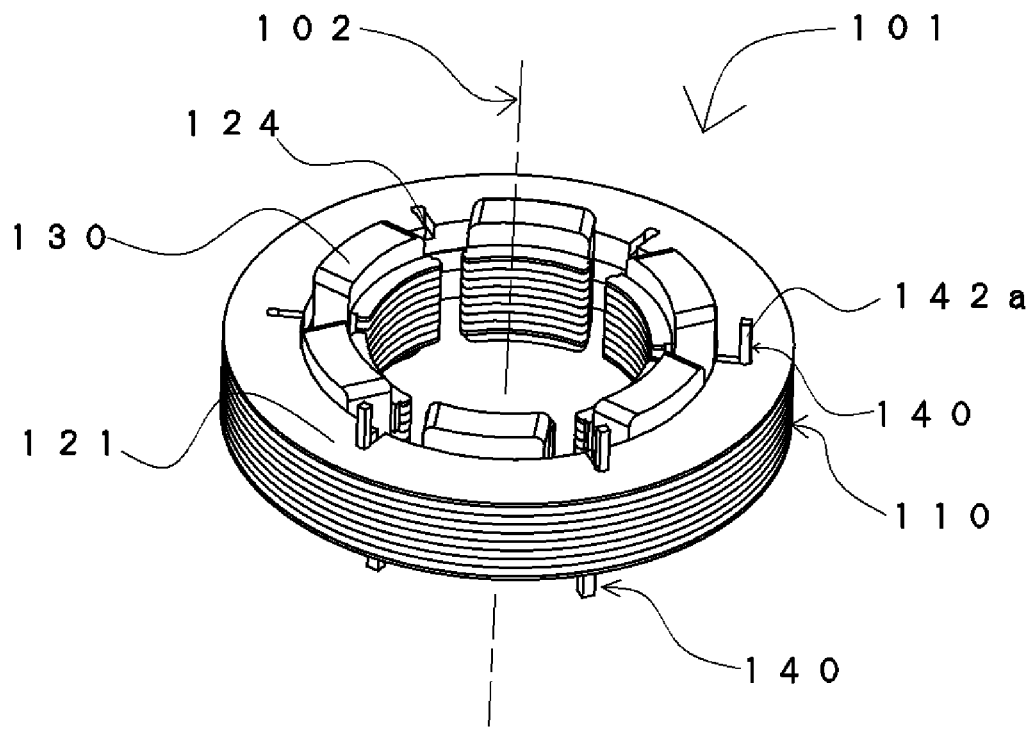
Figure 4B:
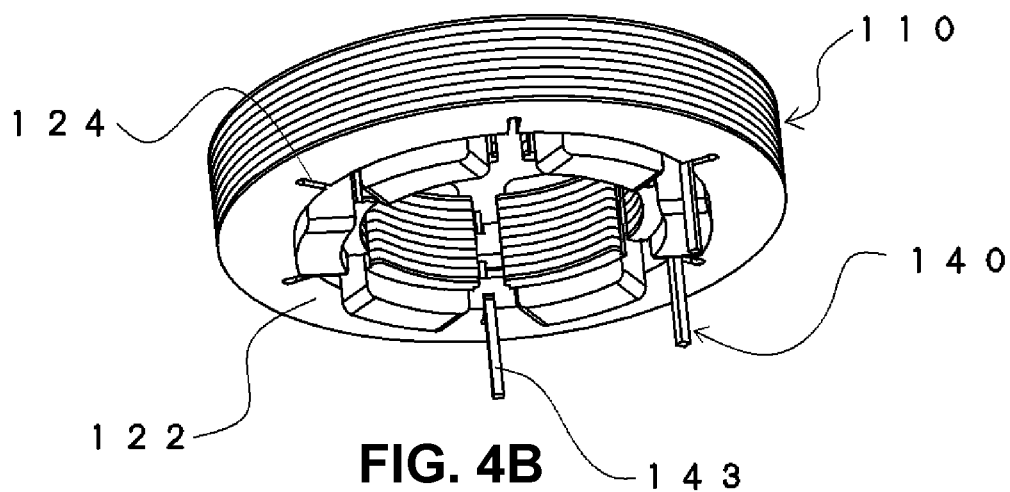
Figure 5A:
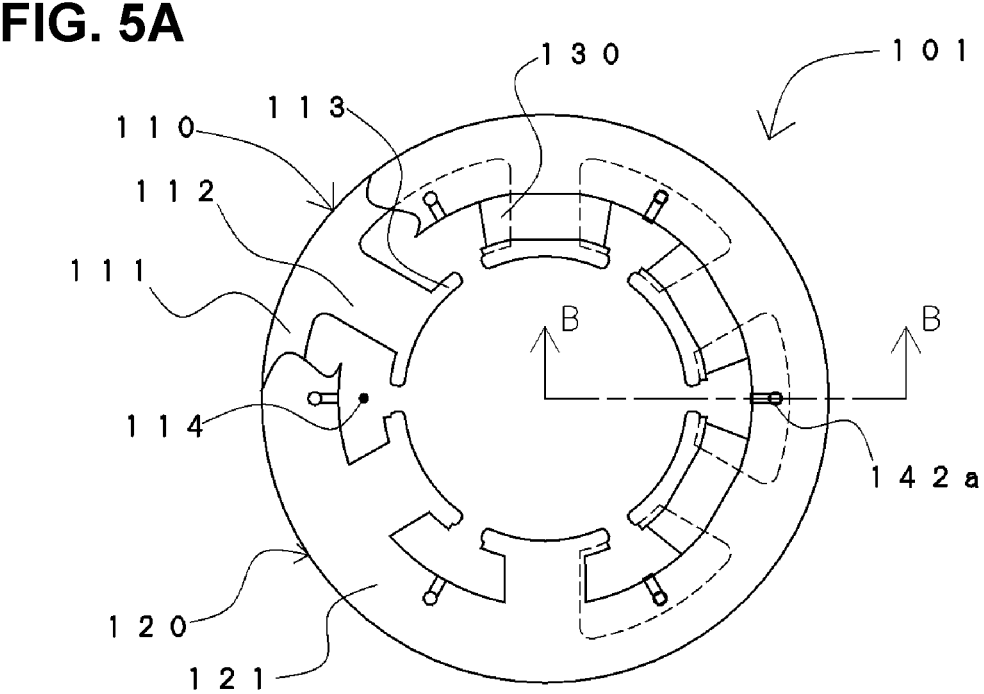
Figure 5B:
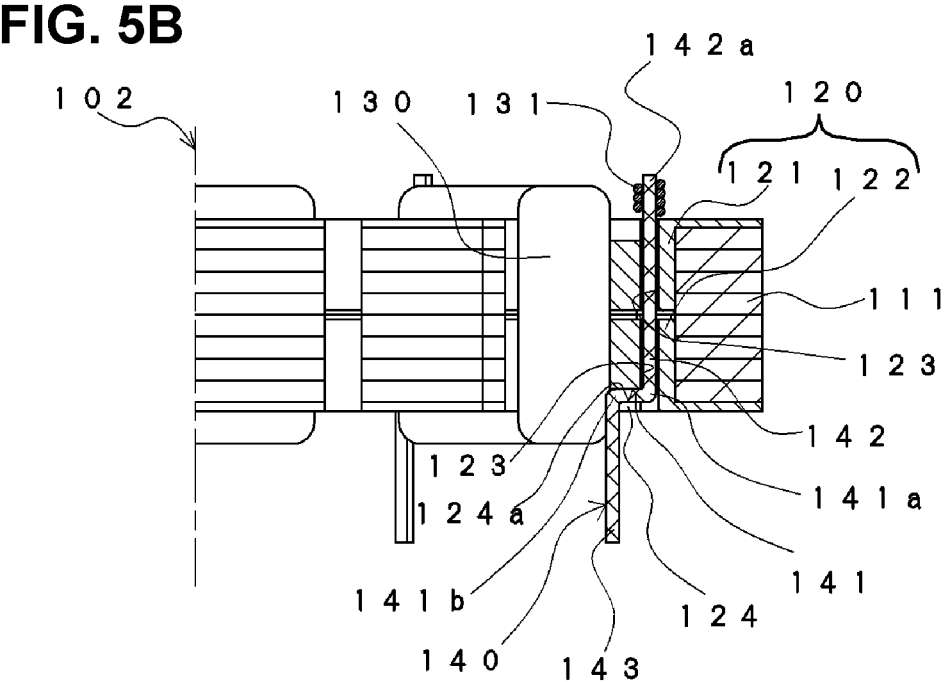
Figure 7A:
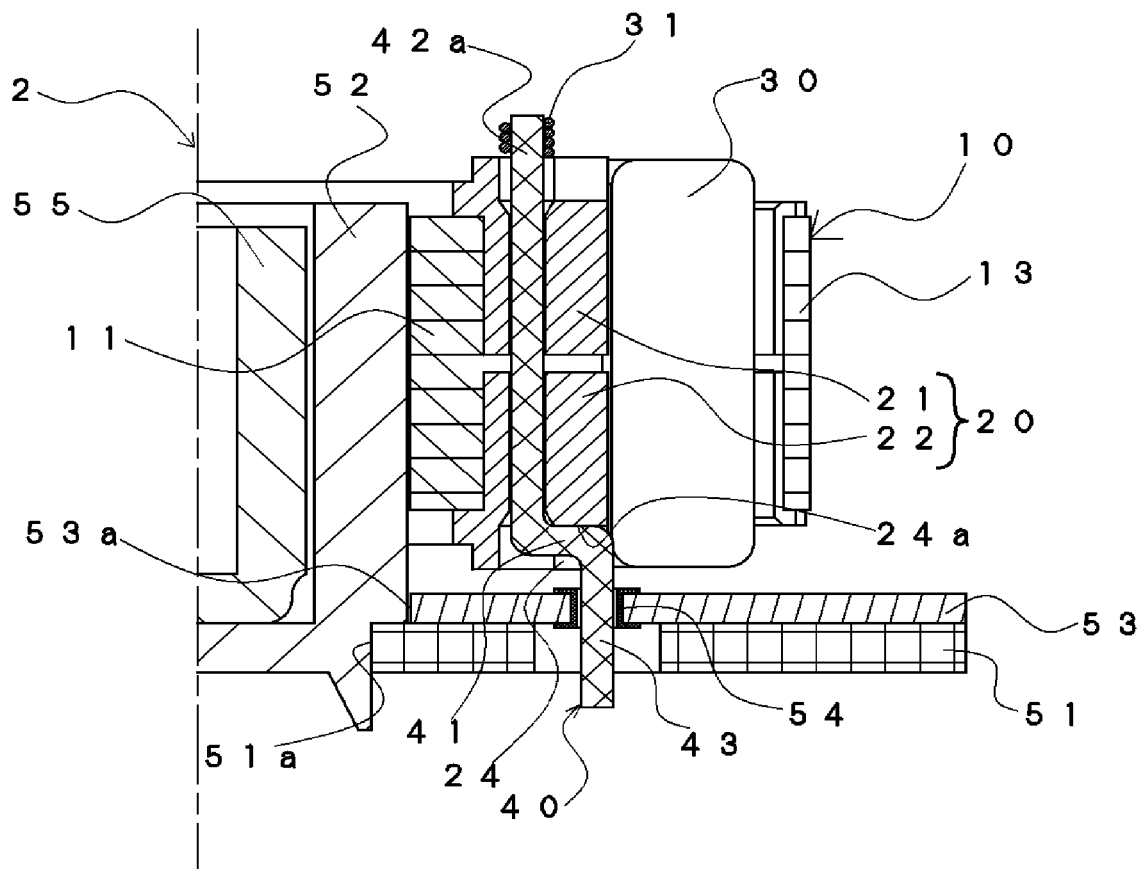

In the present specification, the direction parallel to the central axis in FIG. 3, FIG. 5B and FIG. 7A is referred to as the "axial direction," the radial direction having the central axis as its center is referred to as the "radial direction," and the circumferential direction having the central axis as its center is referred to as the "circumferential direction." The upward and downward directions in FIG. 3, FIG. 5B and FIG. 7A are referred to simply as "upward" and "downward." The direction in which the stator is inserted in FIGS. 10A-10C and FIGS. 11A-11C is referred to as the "insertion direction."

Note that, the upward and downward directions do not necessarily correspond to the positional relationships or directions when the actual device is assembled.

Hereinafter modes of embodiment of the present invention are illustratively described based on the drawings.

First Exemplary Mode of Embodiment

The stator in the first exemplary mode of embodiment of the present invention is described using FIG. 1A-1C through FIG. 3. The stator 1 is a stator in a so-called outer rotor type brushless motor, and has a core 10, an insulating member 20 covering the core 10, a plurality of windings 30 wound on the insulating member 20, and a plurality of conductive members 40 penetrating the insulating member 20.

Figure 1A:
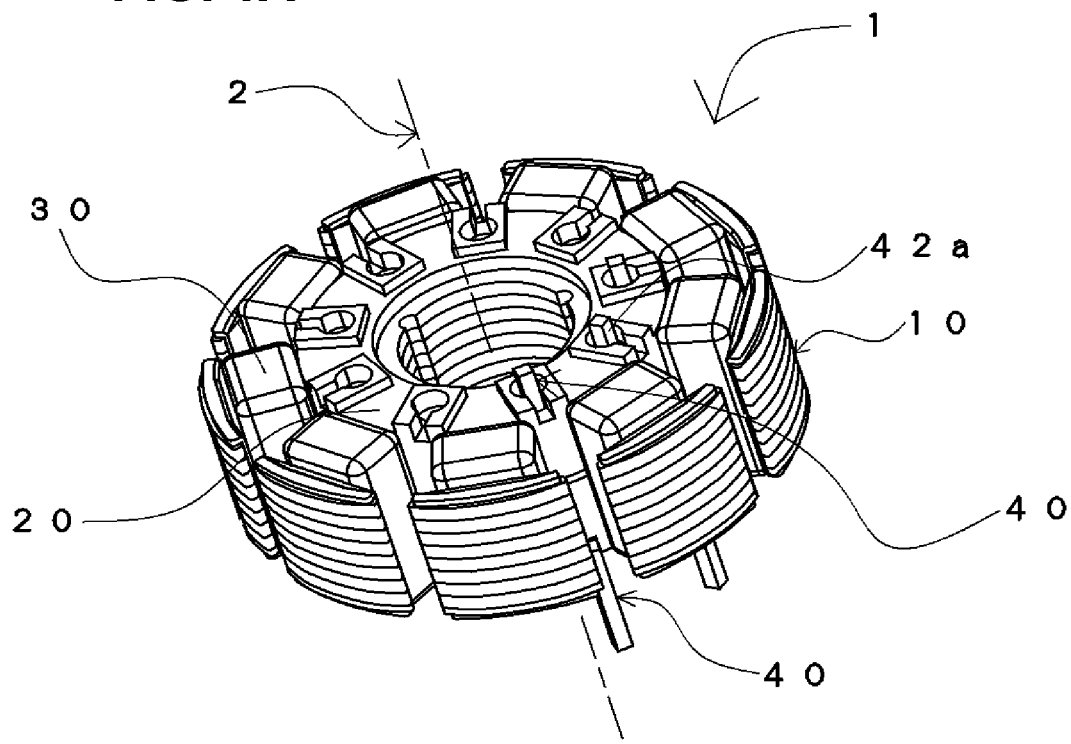
Figure 1B:
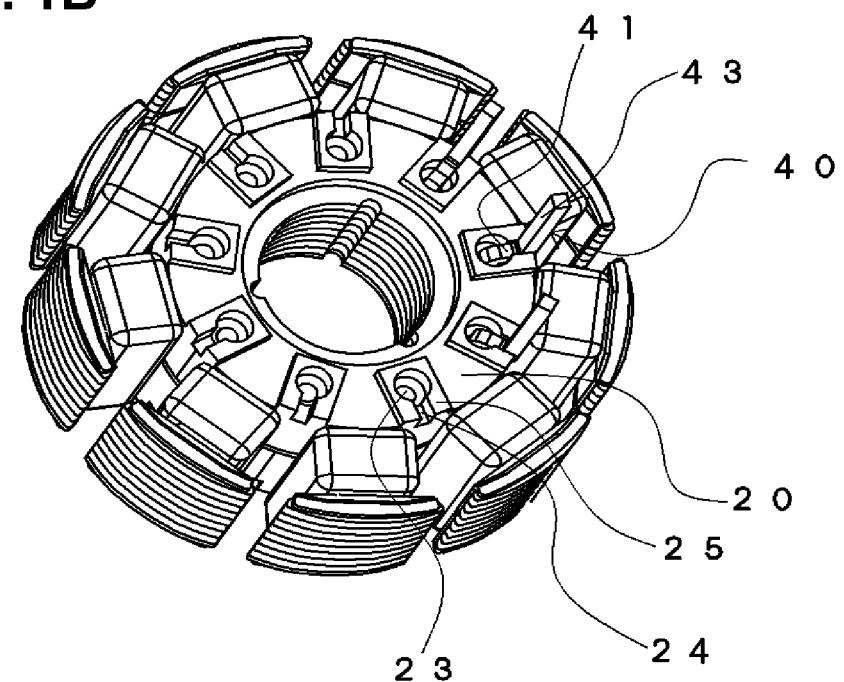
Figure 2:
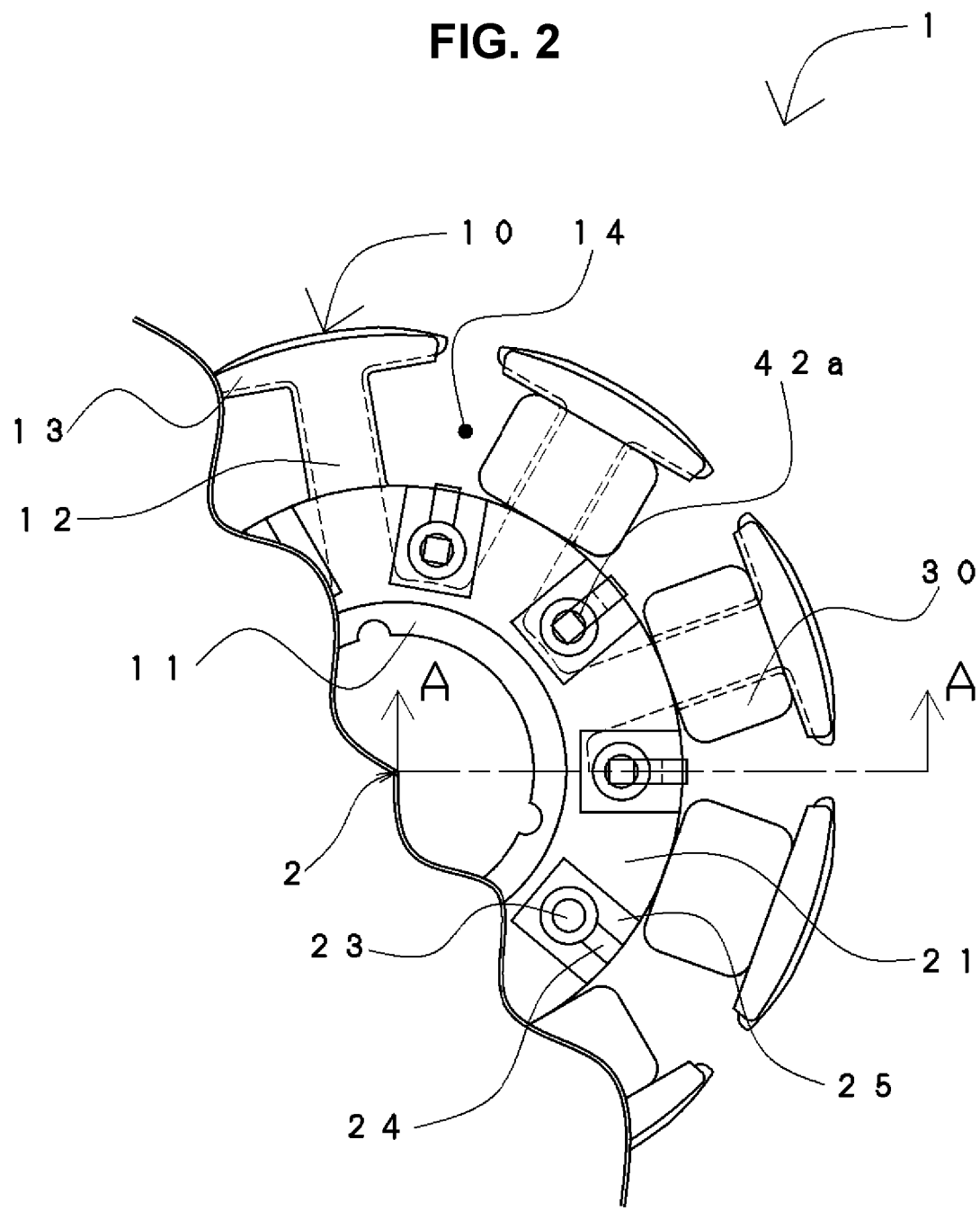
FIG. 2 is a schematic view of the stator in the first exemplary mode of embodiment of the present invention.

The core 10 is disposed around the central axis 2. The core 10 comprises a magnetic body and has a circular part 11 formed so as to surround the central axis 2, a plurality of pole teeth 12 extending radially outward in the radial direction from the circular part 11, and flange parts 13 extending circumferentially from the ends of the pole teeth 12. Slots 14 are formed between the pole teeth 12. To facilitate explanation, a winding 30 wound onto one of the pole teeth 12 is not shown in FIG. 2.

The insulating member 20 is molded from insulating resin and consists of a first core cover 21 that is mounted on the core 10 from above in the axial direction and a second core cover 22 that is mounted on the core 10 from below in the axial direction. The insulating member 20 covers the upper and lower surfaces and outer peripheral face of the circular part 11 of the core 10, the periphery of the pole teeth 12, and the inner peripheral face of the flange part 13, and ensures insulation between the core 10 and the windings 30 as well as the conductive members 40 described below.

In the present exemplary mode of embodiment, the insulating member 20 comprises the first core cover 21 and the second core cover 22, but it may also be configured as a single insulating member by way of methods such as insert molding.

The insulating member 20 has penetration holes 23 for inserting and holding the insertion parts 42 of the conductive members 40 described below, in the axial direction. These penetration holes 23 are provided between the pole teeth 12 in the vicinity of the circular part 11, and these penetration holes 23 correspond to the penetrated part, in the present exemplary mode of embodiment. Furthermore, on the lower surface of the insulating member 20, receiving grooves 24 are formed from the open ends of the penetration holes 23, extending toward the outer side in the radial direction, for receiving the joining parts 41 of the conductive members 40 described below. The bottom surface 24a of the receiving groove 24 is substantially parallel to the lower surface of the insulating member 20. Raised parts 25 protruding in the axial direction are formed around the open ends of the penetration holes 23 and the receiving grooves 24, and these raised parts 25 ensure that the depth of the receiving grooves 24 are sufficient to receive the joining parts 41. In the present exemplary mode of embodiment, in order to reduce material costs, the first core cover 21 and the second core cover 22 are the same shape, and therefore, the receiving grooves 24 and the raised parts 25 are formed in the upper surface of the insulating member 20 as well. Furthermore, a penetration hole 23, a receiving groove 24, and a raised part 25 are provided between all of the pole teeth 12.

The conductive member 40 comprises: a joining part 41, which is provided substantially parallel to the bottom surface 24a of the receiving groove 24 that is provided in the insulating member 20, and extends in the radial direction; an insertion part 42 that rises axially upward from the radially inner end 41a of the joining part 41; and a board connection part 43 that descends axially downward from the radially outer end 41b of the joining part 41. The conductive member 40 in the present exemplary mode of embodiment is formed by bending a linear conductor with a substantially square cross-section at two locations, the radially inner end 41a and the radially outer end 41b. Note that the conductive member 40 may be formed by any method, such as, not only bending a linear conductor, but also, for example, press bending after punching out a sheet-form conductor. The cross-sectional shape is not limited to substantially square, but rather this can also have a circular or flat shape, in a cross-section.

The insertion part 42 of the conductive member 40 is inserted into the penetration hole 23 from below the insulating member 20 and is held so that it penetrates the insulating member 20. At that time, the end of the insertion part 42 protrudes beyond the upper raised part 25 of the insulating member 20 and serves as a winding connection part 42a for electrically connecting a winding 30 described below. The joining part 41 of the conductive member 40 is received in the receiving groove 24 provided below the insulating member 20, and contacts the bottom surface 24a of the receiving groove over substantially the entire region. At this time, the conductive member 40 is fixed by light press-fitting, but it may also be fixed using methods such as dropping an adhesive into the opening of the penetration hole 23.

The windings 30 for supplying drive power are wound on the pole teeth 12, the peripheries of which are covered by the insulating member 20. A winding end 31 is wound around the winding connection part 42a of a conductive member 40 and is electrically connected by any method, such as welding or soldering. Since the connection work is performed at the winding connection part 42a protruding above the stator 1, the connection work can be performed more easily than when soldering is performed between the lower part of the stator and the circuit board.

Since the joining part 41 of the conductive member 40 is in contact with the bottom surface 24a of the receiving groove in the insulating member 20 over substantially the entire region, even if a large force is applied to the conductive member 40 in the axially upward direction, axially upward movement of the conductive member 40 due to deformation of the insulating member 20 is prevented. Furthermore, since the joining part 41 of the conductive member 40 is received in the receiving groove 24, even if a force is applied to the conductive member 40 such as would cause it to rotate in the circumferential direction, unnecessary rotation of the conductive member 40 can be prevented.

In the present exemplary mode of embodiment, the configuration is such that the joining part 41 of the conductive member 40 is shaped so as to extend in the radial direction, the insertion part 42 rises from the radially inner end 41a of the joining part 41, and the board connection part 43 descends from the radially outer end 41b of the joining part 41, but there is no limitation thereto. For example, the insertion part may rise from the radially outer end, and the board connection part may descend from the radially inner end. Furthermore, while the joining part 41 is arranged so as to extend in the radial direction, it can also be arranged to extend in the circumferential direction. In this case, it is possible to increase the length of the joining part, which strengthens the resistance to large forces in the axially upward direction.

A press-fitting part (not shown) with a different cross-sectional shape from adjacent potions may be provided at the board connection part 43 of the conductive member 40. The term press fitting refers to providing a press-fitting part, having a different cross-sectional shape than that of other portions, at the connection terminal, and press fitting the press-fitting part into a through-hole provided on the board, so that the two are made continuous as a result of the contact caused by the deformation pressure thereof. The present exemplary mode of embodiment has a great resistance to forces, especially upward in the axial direction, that are produced when the board connection part 43 is press-fitted into a circuit board (not shown) and thus is suitable for connection to a circuit board by press-fitting, and allows for very reliable connection, without using solder.

Second Exemplary Mode of Embodiment

The stator in the second exemplary mode of embodiment of the present invention is described using FIGS. 4A-4B and 5A-5B The stator 101 is a stator in a so-called inner rotor type brushless motor, and has a core 110, an insulating member 120 covering the core 110, a plurality of windings 130 wound on the insulating member 120, and a plurality of conductive members 140 penetrating the insulating member 120.

The core 110 is disposed around the central axis 102. The core 110 comprises a magnetic body and has a circular part 111 formed to surround a central axis 102, a plurality of pole teeth 112 extending radially inward in the radial direction from the circular part 111, and flange parts 113 extending circumferentially from the ends of the pole teeth 112. Slots 114 are formed between the pole teeth 112. In FIG. 5A, to facilitate explanation, the windings 130, which are wound around the plurality of pole teeth 113 are not shown, and a part of the insulating member 120 is cut away to expose the core 110.

The insulating member 120 is molded from insulating resin and consists of a first core cover 121 that is mounted on the core 110 from above in the axial direction and a second core cover 122 that is mounted on the core 110 from below in the axial direction. The insulating member 120 covers the upper and lower surfaces and inner peripheral face of the circular part 111 of the core 110, the periphery of the pole teeth 112, and the radially outer peripheral face of the flange parts 113, and ensures insulation between the core 110 and the windings 130 as well as the conductive members 140 described below.

In the present exemplary mode of embodiment, the insulating member 120 comprises the first core cover 121 and the second core cover 122, but this may also be configured as a single insulating member by way of methods such as insert molding.

The insulating member 120 has penetration holes 123 for inserting and holding the insertion part 142 of the conductive members 140 described below, in the axial direction. These penetration holes 123 are provided between the pole teeth 112 in the vicinity of the circular part 111, and these penetration holes 123 correspond to the penetrated part, in the present exemplary mode of embodiment. Furthermore, on the lower surface of the insulating member 120, receiving grooves 124 are formed from the open ends of the penetration holes 123, extending inward in the radial direction, for receiving the joining parts 141 of the conductive members 140 described below. The bottom surface 124a of the receiving groove 124 is substantially parallel to the lower surface of the insulating member 120. In the present exemplary mode of embodiment, in order to reduce material costs, the first core cover 121 and the second core cover 122 are the same shape, and therefore, the receiving grooves 124 are formed on the upper surface of the insulating member 120 as well. Furthermore, a penetration hole 123 and a receiving groove 124 are provided between all of the pole teeth 112. Furthermore, raised parts protruding in the axial direction may be formed around the open ends of the penetration holes 123 and the receiving grooves 124, such that these raised parts ensure that the depths of the receiving groove 124 is sufficient to receive the joining part 141.

The conductive member 140 comprises: a joining part 141, which is provided substantially parallel to the bottom surface 124a of the receiving groove 124 that is provided in the insulating member 120, and extends in the radial direction; an insertion part 142 that rises axially upward from the radially outer end 141a of the joining part 141; and a board connection part 143 that descends axially downward from the radially inner end 141b of the joining part 141. The conductive member 140 in the present exemplary mode of embodiment is formed by bending a linear conductor with a substantially square cross-section at two locations, the radially outer end 141a and the radially inner end 141b. Note that the conductive member 140 may be formed by any method, such as, not only bending a linear conductor, but also, for example, press bending after punching out a sheet-form conductor. The cross-sectional shape is not limited to substantially square, but rather this can also have a circular or flat shape, in a cross-section.

The insertion part 142 of the conductive member 140 is inserted into the penetration hole 123 from below the insulating member 120 and is held so that it penetrates the insulating member 120. At that time, the end of the insertion part 142 protrudes beyond the top of the insulating member 120 and serves as a winding connection part 142a for electrically connecting a winding 130 described below. The joining part 141 of the conductive member 140 is received in the receiving groove 124 below the insulating member 120, and contacts the bottom surface 124a of the receiving groove over substantially the entire region. At this time, the conductive member 140 is fixed by light press-fitting, but it may also be fixed by way of methods such as dropping an adhesive into the opening of the penetration hole.

The windings 130 for supplying drive power are wound on the pole teeth 112, the peripheries of which are covered by the insulating member 120. A winding end 131 is wound around the winding connection part 142a of a conductive member 140 and is electrically connected by any method, such as welding or soldering. Since the connection work is performed at the winding connection part 142a protruding above the stator 101, the connection work can be performed more easily than when soldering is performed between the lower part of the stator and the circuit board.

Since the joining part 141 of the conductive member 140 is in contact with the bottom surface 124a of the receiving groove in the insulating member 120 over substantially the entire region, even if a large force is applied to the conductive member 140 in the axially upward direction, axially upward movement of the conductive member 140 due to deformation of the insulating member 120 is prevented. Furthermore, since the joining part 141 of the conductive member 140 is received in the receiving groove 124, even if a force is applied to the conductive member 140 such as would cause it to rotate in the circumferential direction, unnecessary rotation of the conductive member 140 can be prevented.

In the present exemplary mode of embodiment, the configuration is such that the joining part 141 of the conductive member 140 is shaped so as to extend in the radial direction, the insertion part 142 rises from the radially outer end 141a of the joining part 141, and the board connection part 143 descends from the radially inner end 141b of the joining part 141, but there is no limitation thereto. For example, the insertion part may rise from the radially inner end, and the board connection part may descend from the radially outer end. The joining part 141 was arranged to extend in the radial direction, but it can also be arranged to extend in the circumferential direction. In this case, it is possible to increase the length of the joining part, which strengthens the resistance to large forces in the axially upward direction.

A press-fitting part (not shown) with a different cross-sectional shape from adjacent potions may be provided at the board connection part 143 of the conductive member 140. In the present exemplary mode of embodiment there is a great resistance to forces, especially upward in the axial direction, that are produced when the board connection part 143 is press-fitted into a circuit board (not shown) and thus this is suitable for connection to a circuit board by press-fitting, and it allows for very reliable connection, without using solder.

Third Exemplary Mode of Embodiment

A third exemplary mode of embodiment of a brushless motor of the present invention is described using 6A-6C and 7A-7C A brushless motor 50 has a stator base 51, a bearing housing 52 and a circuit board 53 fixed on the stator base 51, a bearing 55 provided inside the bearing housing 52, a stator 1, and a rotor 57 having a shaft 56. Since the configuration of the stator 1 is the same as that of the stator 1 shown in the first exemplary mode of embodiment, for the configuration of the stator 1, referring to FIGS. 1A-1B to FIG. 3, as appropriate, the same reference numerals are applied to the same components and redundant descriptions are omitted.

The stator base 51 is made of a thin sheet of metal such as iron or aluminum, worked into a predetermined shape by pressing, and has a central hole 51a in the vicinity of the center thereof. The bearing housing 52, which has a bottomed substantially cylindrical shape, is fixed coaxially with the central hole 51a. Inside the bearing housing 52, a bearing 55 made, for example, of an oil-impregnated sintered material, is fixed by way of any method.

The rotor 57 is formed in a lidded, substantially cylindrical shape and has a cylindrical part 57a and a substantially disc-shaped lid part 57b provided at the upper end of the cylindrical part 57a. The shaft 56 is press-fitted into the center of the lid part 57b so as to vertically penetrate therethrough. A drive magnet (not shown) is provided on the inner circumferential surface of the cylindrical part 57a, the drive magnet being arranged facing the pole teeth 12 and the flange parts 13 of the core 10 in the stator 1, in the radial direction. The shaft 56 is supported by the bearing 55.

The circuit board 53 has a central hole 53a and is fixed on the stator base 51 by way of any method, such as adhesion, so that the bearing housing 52 can be inserted through the central hole 53a. A Hall element (not shown) is provided on the circuit board 53 as a means of detecting the position of the magnetic poles of the rotor 57. Furthermore, the circuit board 53 has through-holes 54 at positions corresponding to the board connection parts 43 of the conductive members 40 which are provided in the stator 1.

The stator 1 is inserted and fixed so that the inner circumferential face of the circular part 11 in the core 10 touches the outer circumferential face of the bearing housing 52. The conductive members 40 are inserted into the through-holes 54 provided in the circuit board 53 and are electrically connected by way of any method, such as soldering.

Figure 7B:
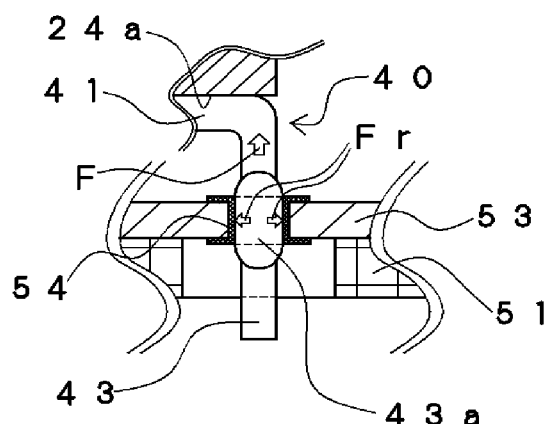
Figure 7C:
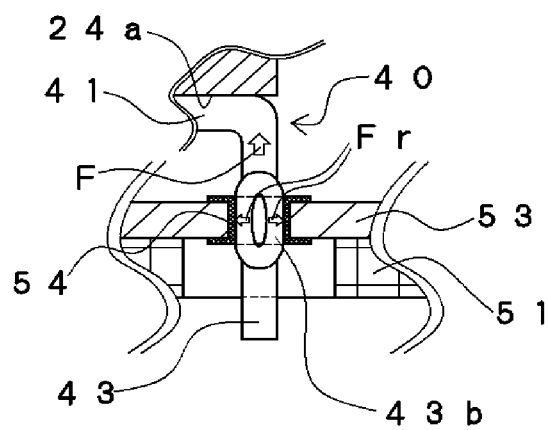

A press-fitting part with a cross-sectional shape different from an adjacent portion may be provided on the board connection parts 43 of the conductive members 40, and the conductive members 40 and the through-holes 54 may be connected by press-fitting. The press-fitting part that is provided on the board connection part 43 can be, for example, a large diameter part 43a resulting from press deforming a portion of the board connection parts 43, as shown in FIG. 7B, or an elastic contact part 43b resulting from working a portion of the board connection part 43, as shown in FIG. 7C.

Before insertion into the through-hole 54, the large-diameter part 43a or the elastic contact part 43b has a slightly larger diameter than the hole diameter of the through-hole 54, such that the fitting relationship is a press fitting. When the large-diameter part 43a or the elastic contact part 43b is press-fitted into the through-hole 54, the large-diameter part 43a or the elastic contact part 43b is deformed and a restoring force $F_r$ is generated. The restoring force $F_r$ makes it possible to achieve an electrical connection and a high fixing force, with respect to the inner surface of the through-hole 54.

Upon press fitting the large-diameter part 43a or elastic contact part 43b of the board connection part 43 into the through-hole 54, a large reaction force F is generated in the axially upward direction, against the conductive member 40. In the present exemplary mode of embodiment, the joining part 41 provided on the conductive member 40 is in contact with the bottom surface 24a of the receiving groove 24 in the insulating member 20 over substantially the entire region, and therefore the conductive member 40 does not unnecessarily move in the axial direction, even when subjected to a large reaction force F. Accordingly, this is suitable for connection to a circuit board by press-fitting and allows for a very reliable connection, without using solder.

The present exemplary mode of embodiment describes an outer rotor type brushless motor, but there is no limitation to this. For example, it is possible to use the stator 101 shown in FIGS. 4A-4B and FIGS. 5A-5B to make an inner rotor type brushless motor.

Fourth Exemplary Mode of Embodiment

Figure 8A:
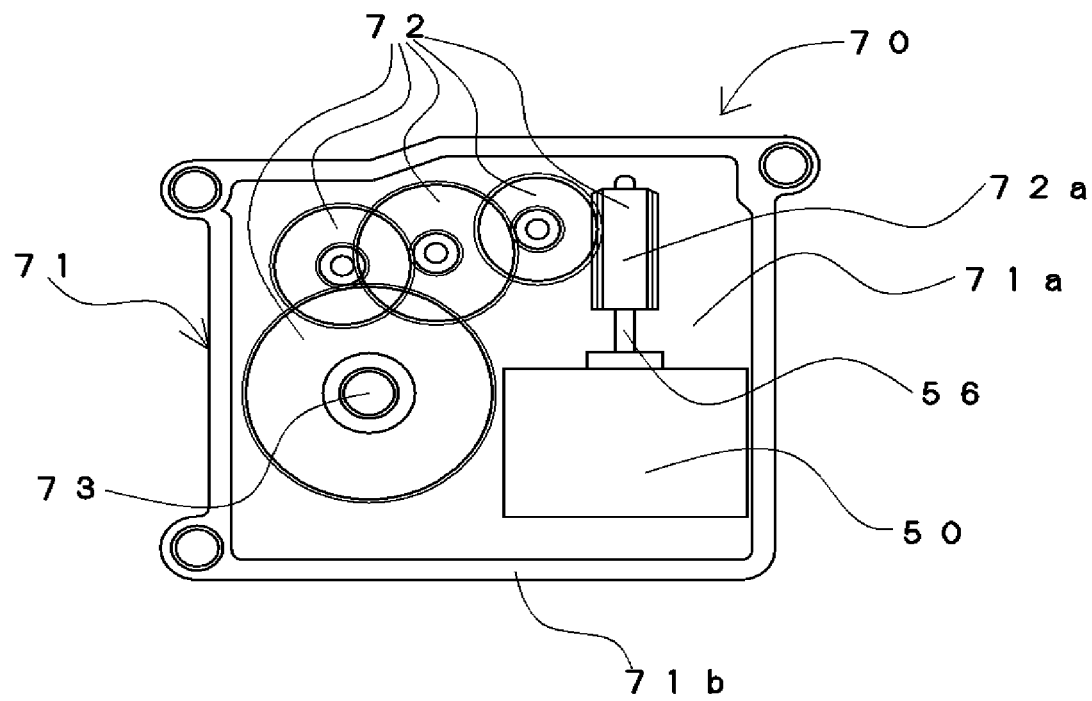

A motor actuator in a fourth exemplary mode of embodiment of the present invention is described using FIG. 8A. The motor actuator 70 has a lower case 71, an upper case (not shown), a brushless motor 50 that serves as the drive source, a gear mechanism 72 that transmits the rotational driving force while reducing the speed, and an output shaft 73. Since the configuration of the brushless motor 50 is the same as that of the brushless motor 50 shown in the third exemplary mode of embodiment, for the configuration of the brushless motor 50, referring to FIGS. 6A-6C and FIGS. 7A-7C as appropriate, the same reference numerals are applied to the same components and redundant descriptions are omitted.

The lower case 71 has a bottom wall 71a and four side walls 71b, and is in the shape of a substantially rectangular container with one side open. A housing with a predetermined internal space is formed by assembling an upper case (not shown), which is also open on one side, with the opening sides meeting.

The bottom wall 71a of the lower case 71 is provided with a housing (not shown) for the brushless motor 50, and the brushless motor 50 is arranged so that the shaft 56 of the brushless motor 50 is in a direction orthogonal to an output shaft 73, described below.

The rotational driving force of the brushless motor 50 is transmitted to the output shaft 73 through a gear mechanism 72 including a worm gear 72a. A crank or the like, not shown in the figure, is attached to this output shaft 73.

By configuring the brushless motor 50 and the motor actuator 70 as described above, a highly reliable motor actuator can be realized, in which the conductive member 40 of the stator 1 and the circuit board 53 are connected by press-fitting, which is particularly suitable for automotive motor actuators and the like that require high reliability.

Figure 8B:
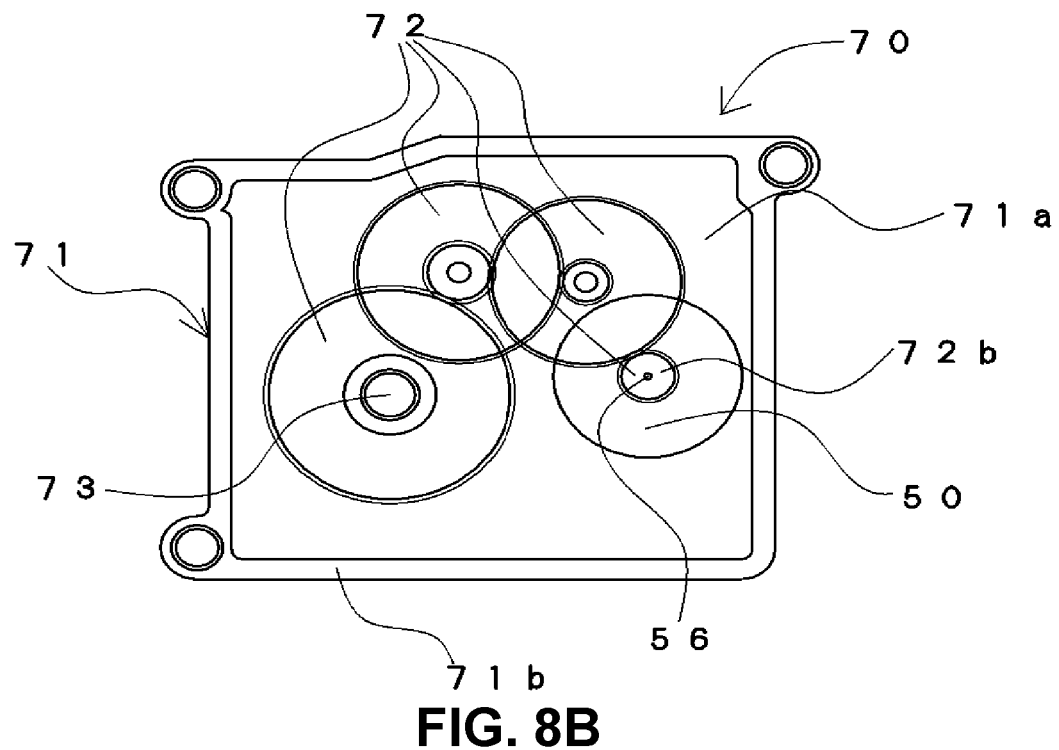
Figure 9A:
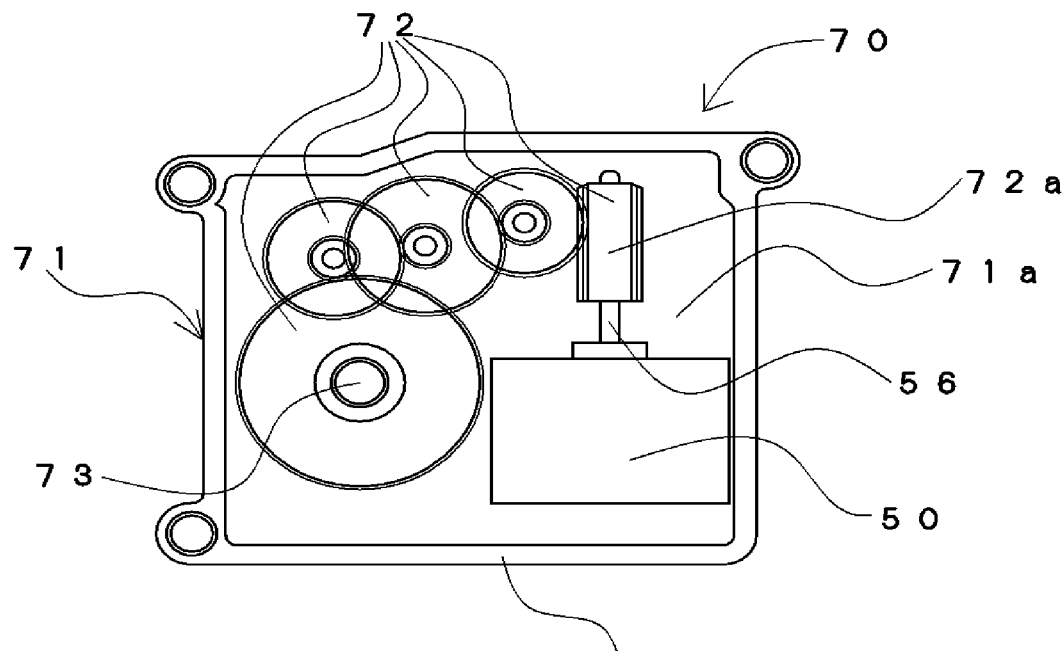
Figure 9B:
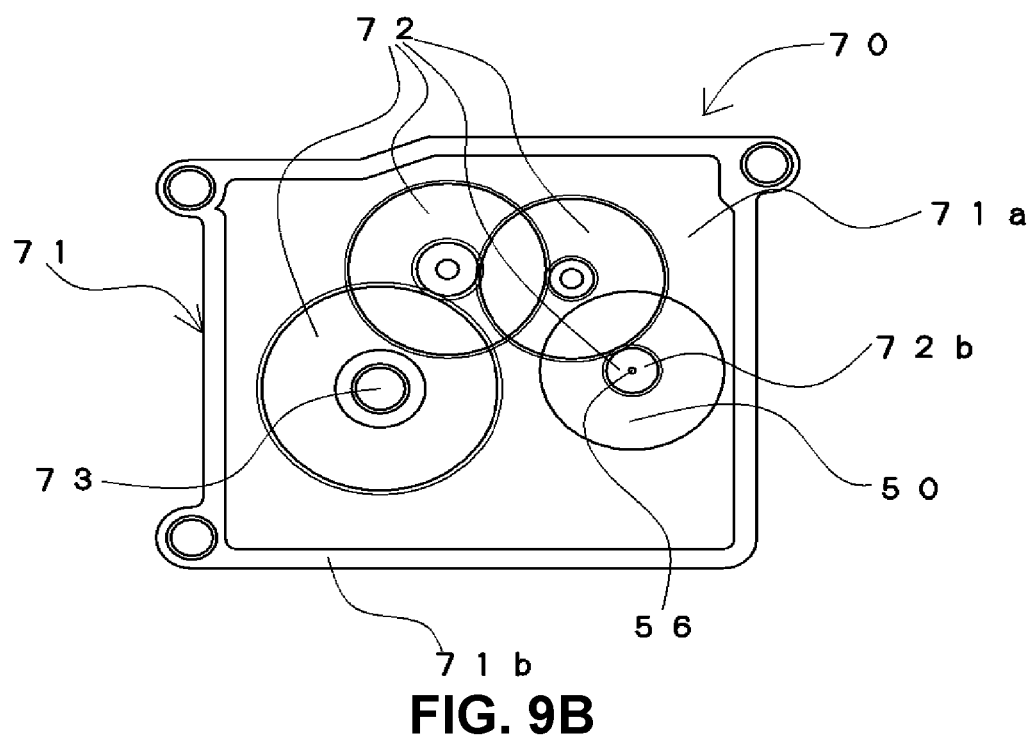

In the present exemplary mode of embodiment, an outer rotor type brushless motor 50 having a stator 1 is used as the drive source, but there is no limitation to this. The inner rotor type brushless motor having a stator 101 shown in FIGS. 4A-4B and FIGS. 5A-5B may be used as the drive source. As shown in FIG. 8B, it is also possible to use a configuration in which a pinion gear 72b is attached to the shaft 56 and the brushless motor 50 is arranged so that the shaft 56 and output shaft 73 of the brushless motor 50 are parallel.

Fifth Exemplary Mode of Embodiment

A motor actuator in a fifth exemplary mode of embodiment of the present invention is described using FIGS. 9A-9B and FIGS. 10A-10C. The motor actuator 80 in the present exemplary mode of embodiment can be used, for example, as a drive source for a vehicle grille shutter device, and principally has a lower case 81, an upper case 82, a brushless motor 90 that serves as a drive source, a gear mechanism 85 that transmits the rotational driving force while reducing the speed, and an output shaft 86.

The brushless motor 90 is a so-called outer rotor type brushless motor, and the configuration of the stator and circuit board are the same as shown in the first exemplary mode of embodiment and the third exemplary mode of embodiment. Accordingly, for the configuration of the stator and circuit board in the brushless motor 90, referring to FIGS. 1A-1B to FIG. 3, FIGS. 6A-6C, and FIGS. 7A-7C, as appropriate, the same reference numerals are applied to the same components and redundant descriptions are omitted.

The lower case 81 has a bottom wall 81a and four side walls 81b, and is in the shape of a substantially rectangular container with one open side. A housing with a predetermined internal space is formed by assembling the upper case 82 with the opening sides meeting. The upper case 82 is provided with an opening (not shown) to expose the output shaft 86 described below to the outside of the upper case.

Figure 10A:
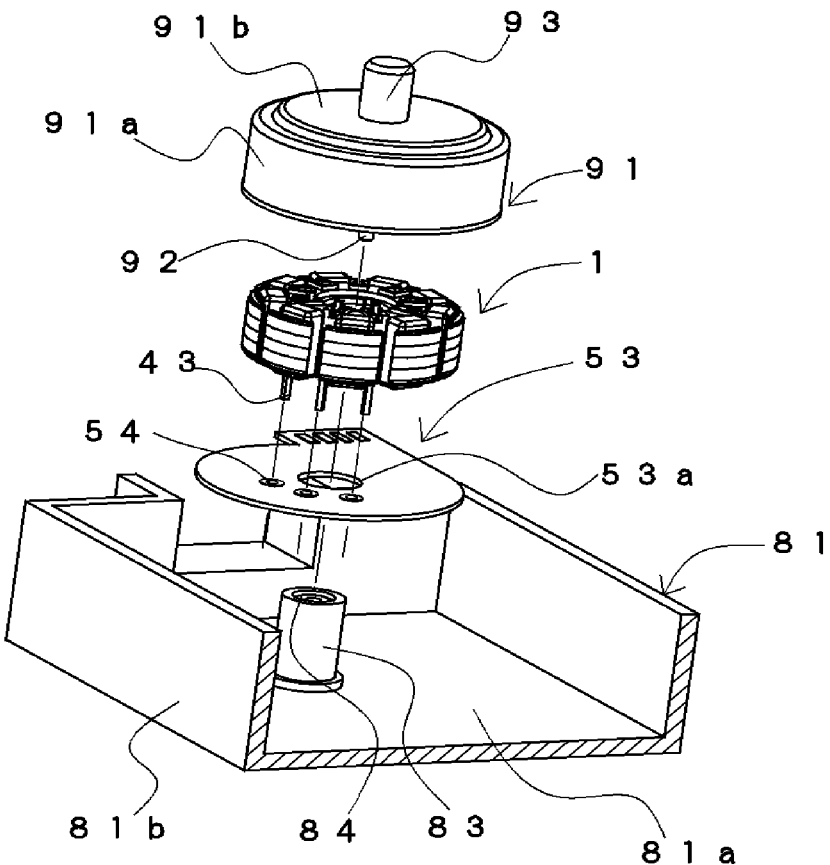
Figure 10B:
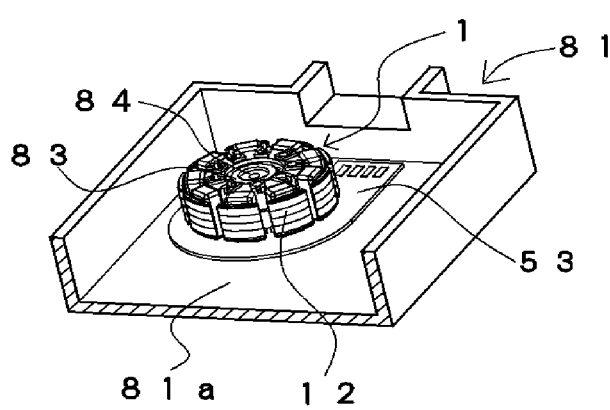
Figure 10C:
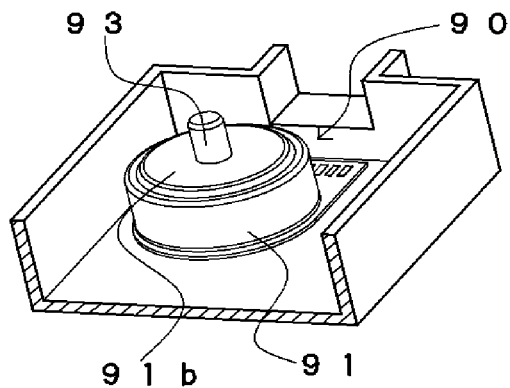
Figure 12:
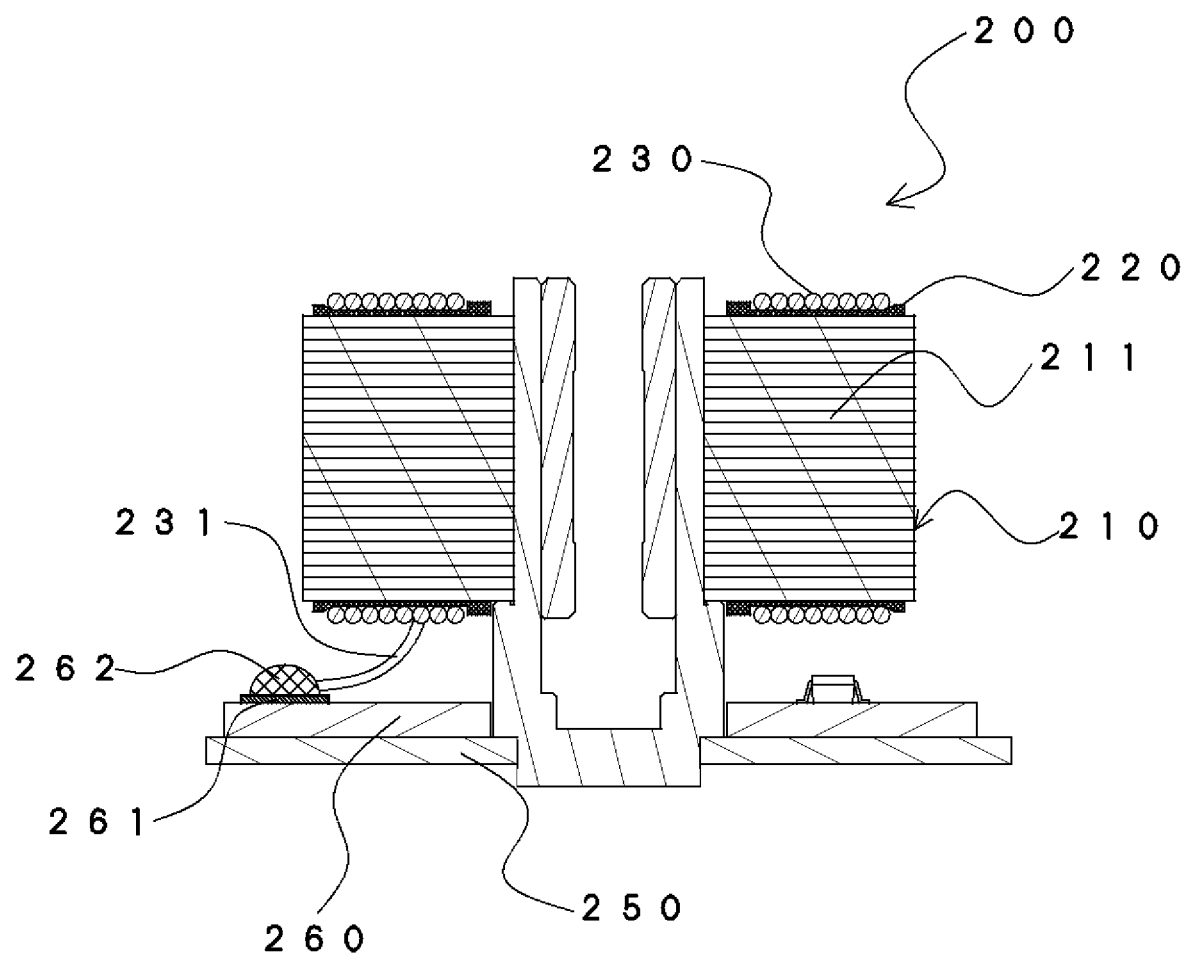
FIG. 12 shows a schematic view of a connection between a winding and a circuit board in a conventional example.

On the bottom wall 81a of the lower case 81, a substantially cylindrical stator retaining part 83, which serves to fix the stator 1 of the brushless motor 90, is formed integrally with the bottom wall 81a of the lower case 81. A bearing 84 made of, for example, oil-impregnated sintered material is fixed inside the cylindrical part of the stator retaining part 83 by way of any method, such as press fitting. The bearing 84 corresponds to the rotational support part in the present exemplary mode of embodiment. The circuit board 53 is fixed so that a central hole 53a fits on the stator retaining part 83. In FIGS. 10A-10C, in order to facilitate explanation, the illustration is limited to the area around the brushless motor 90, and the gear mechanism 85 and the like are omitted.

The rotor 91 is formed in a lidded, substantially cylindrical shape and has a cylindrical part 91a and a substantially disc-shaped lid part 91b provided at the upper end of the cylindrical part 91a. A shaft 92 is fixed in the center of the lid part 91b by press fitting. A drive magnet (not shown) is provided on the inner circumferential surface of the cylindrical part 91a, the drive magnet being arranged facing the pole teeth 12 and the flange part 13 of the core 10 of stator 1, in the radial direction. The shaft 92 is supported by the bearing 84. A pinion gear 93 is provided coaxially with the shaft 92 above the lid part 91b and meshes with a first-stage gear 85a of the gear mechanism 85.

The stator 1 is inserted and fixed so that the inner circumferential face of the circular part 11 of the core 10 touches the outer circumferential face of the stator retaining part 83. The conductive members 40, which are provided so as to penetrate the insulating member 20, are inserted into through-holes 54 provided in the circuit board 53 and are electrically connected by way of any method. When drive power is supplied to the conductive members 40, a rotating magnetic field is generated from the pole teeth 12 of the core 10, with respect to the rotor magnet (not shown), and a rotational driving force is generated in the rotor 91. The rotational driving force generated in the rotor 91 is transmitted from the pinion gear 93 to the gear mechanism 85 and output to the outside via the output shaft 86.

A press-fitting part with a cross-sectional shape different from an adjacent portion may be provided on the board connection parts 43 of the conductive members 40, and the conductive members 40 and the through-holes 54 may be connected by press-fitting. The conductive member 40 has a great resistance to forces, especially upward in the axial direction, and thus is suitable for connection to a board by press-fitting, and allows for very reliable connection, without using solder.

In the present exemplary mode of embodiment, the stator retaining part 83 is integral with the bottom wall 81a of the lower case 81, and the circuit board 53 and the stator 1 are fitted so as to be fixed to the stator retaining part 83 so that the stator 1 is above, but there is no limitation to this. The stator retaining part may be separate from the case and fixed to the bottom wall of the case by way of any method, such as adhesion. The stator 1 and circuit board 53 may be fitted so as to be fixed so that the stator 1 is below. In this case, because the stator 1 will be below the circuit board 53, the board connection parts 43 will be mounted so as to face upward in the axial direction.

Sixth Exemplary Mode of Embodiment

A motor actuator in a sixth exemplary mode of embodiment of the present invention is described using FIGS. 9A-9B and FIGS. 11A-11C. In this exemplary mode of embodiment, the brushless motor 90 in the fifth exemplary mode of embodiment is replaced with a so-called inner rotor type brushless motor 190, and principally has a lower case 81, an upper case 82, a brushless motor 190 as the drive source, a gear mechanism 85 that transmits the rotational driving force while reducing the speed, and an output shaft 86.

The configuration of the stator in the inner rotor type brushless motor 190 is the same as that shown in the second exemplary mode of embodiment. Accordingly, for the configuration of the stator 101 in the brushless motor 190, referring to FIGS. 4A-4B and FIGS. 5A-5B, as appropriate, the same reference numerals are applied to the same components and redundant descriptions are omitted.

On the bottom wall 81a of the lower case 81, a substantially circular stator retaining part 183, which serves to fix the stator 101 of the brushless motor 190, is formed integrally with the bottom wall 81a of the lower case 81. Inside of the stator retaining part 183, a shaft 192 is fixed by any method, such as press fitting, so as to be coaxial with the stator retaining part 183. The shaft 192 corresponds to the rotational support part, in the present exemplary mode of embodiment. The circuit board 153 is fixed so that a peripheral part 153a is engaged with the stator retaining part 183. In FIGS. 11A-11C in order to facilitate explanation, the illustration is limited to the area around the brushless motor 190, and the gear mechanism 85 and the like are omitted.

The rotor 191 is formed in a substantially cylindrical shape and has a drive magnet 191a and a penetration hole 191b for inserting the shaft 192. The rotor 191 is rotatably supported by the shaft 192, and the drive magnet 191a is arranged facing the pole teeth 112 and the flange part 113 of the core 110 of the stator 101, in the radial direction. A pinion gear 193 is provided above the rotor 191, coaxial with the penetration hole 191b, and meshes with a first-stage gear 85a in the gear mechanism 85.

The stator 101 is inserted and fixed so that the outer circumferential face of the circular part 111 of the core 110 contacts the inner circumferential face of the stator retaining part 183. The conductive members 140, which are provided so as to penetrate the insulating member 120, are inserted into through-holes 154 provided in the circuit board 153 and are electrically connected by way of any method. When drive power is supplied to the conductive members 140, a rotating magnetic field is generated from the pole teeth 112 of the core 110, with respect to the drive magnet 191a, and a rotational driving force is generated in the rotor 191. The rotational driving force generated in the rotor 191 is transmitted from the pinion gear 193 to the gear mechanism 85 and output to the outside via the output shaft 86.

A press-fitting part with a cross-sectional shape different from an adjacent portion may be provided on the board connection parts 143 of the conductive members 140, and the conductive members 140 and the through-holes 154 may be connected by press-fitting. The conductive member 140 has great resistance to forces, especially upward in the axial direction, and thus is suitable for connection to a board by press-fitting, and allows for very reliable connection without using solder.

In the present exemplary mode of embodiment, the stator retaining part 183 is integral with the bottom wall 81a of the lower case 81, and the circuit board 153 and the stator 101 were fitted so as to be fixed to the stator retaining part 183 so that the stator 101 is above, but there is no limitation to this. The stator retaining part may be separate from the case and fixed to the bottom part of the case by way of any method, such as adhesion. The stator 101 and circuit board 153 may be fitted so as to be fixed so that the stator 101 is below. In this case, the stator 101 will be below the circuit board 153, and therefore the board connection parts 143 of the conductive members 140 will be mounted so as to face upward in the axial direction. The shaft may be provided on the rotor, and this shaft may be supported by a bearing provided in the case.

Exemplary modes of embodiment of the present invention have been described above, but the present invention is not limited to that discussed above, and various modifications other than those discussed above can be made within a scope that does not part from the gist thereof.

For example, in the exemplary modes of embodiment of the present invention, the configuration is such that the conductive members penetrate only the penetration holes in the insulating member, but the configuration may also be such that penetration holes or cutouts are provided in core as well, and both the core and the insulating member are penetrated. Furthermore, although the exemplary modes of embodiments of the present invention describe a motor of the radial gap type, it is naturally possible to apply the invention to a motor of the axial gap type.

What is claimed is:

1. A stator, which is a component of a brushless motor, and which generates a rotating magnetic field with respect to a rotor that can rotate around a central axis, wherein:
   the stator has
   a core comprising a magnetic body,
   an insulating member that covers the core,
   a winding that is wound on the insulating member, and
   a conductive member for supplying drive power to the winding;
   wherein the core includes a circular portion and a plurality of pole teeth extending from the circular portion in a radial direction of the circular portion and formed along a circumferential direction of the circular portion;
   the conductive member comprises
   a joining part that is in contact with a lower surface of the insulating member,
   an insertion part that extends axially upward from one end of the joining part, and
   a board connection part descending axially downward from the other end of the joining part; and
   wherein the insulating member covers the circular portion and the pole teeth, has a penetrated part for penetration in the axial direction by the insertion part, and a receiving groove for receiving the joining part;
   the penetrated part is provided in a vicinity of the circular portion between the pole teeth:
   the receiving groove extends from the penetrated part to a peripheral edge of the insulating member;
   the joining part is arranged in the receiving groove in which said other end of the joining part extends to the peripheral edge of the insulating member; and
   the insertion part extends into the penetrated part from below the insulating member, penetrates the penetrated part, and is electrically connected to the winding above the insulating member.

2. The stator according to claim 1, wherein
the insulating member
has a first core cover that is mounted on the core from above in the axial direction, and
a second core cover that is mounted on the core from below in the axial direction.

3. The stator according to claim 1, wherein
the board connection part
has a press-fitting part, the cross-sectional shape of which differs from other portions.

4. A brushless motor comprising a stator, a rotor rotated by a rotating magnetic field produced by the stator, and a circuit board, wherein:
   the stator has
   a core comprising a magnetic body,
   an insulating member that covers the core,
   a winding that is wound on the insulating member, and
   a conductive member for supplying drive power to the winding;
   wherein the core includes a circular portion and a plurality of poles extending from the circular portion in the radial direction of the circular portion and formed along the circumferential direction of the circular portion;
   the conductive member comprises
   a joining part that is in contact with the lower surface of the insulating member,
   an insertion part that rises axially upward from one end of the joining part, and a board connection part descending axially downward from the other end of the joining part;

the insulating member covers the circular portion and the pole teeth, has a penetrated part for penetration in the axial direction by the insertion part, and a receiving groove for receiving the joining part;

the penetrated part is provided in the vicinity of the circular portion between the pole teeth;

the receiving groove extends from the penetrated part to a peripheral edge of the insulating member;

the joining part is arranged in the receiving groove in which said other end of the joining part extends to the peripheral edge of the insulating member; and the insertion part is inserted into the penetrated part from below the insulating member, penetrates the penetrated part, and is electrically connected to the winding above the insulating member; and the board connection part is electrically connected to the circuit board.

5. The brushless motor according to claim 4, wherein:
the circuit board has a through hole; and
the board connection part is inserted into the through-hole and fixed by way of press-fitting.

6. A motor actuator with a brushless motor according to claim 4, wherein
the motor actuator has
the brushless motor,
a gear mechanism that transmits the rotational driving force of the brushless motor while reducing the speed, and
an output shaft that outputs the rotational driving force to the outside.

7. A motor actuator that transmits rotational driving force of a motor while reducing the speed by way of a gear mechanism, and outputs the rotational driving force of the motor to the outside with an output shaft, wherein
the motor actuator has a stator,
a rotor that is supported coaxially with the stator and is rotated by a rotating magnetic field produced by the stator,
a circuit board having a through-hole,
a rotational support part that rotatably supports the rotor,
a gear mechanism that transmits the rotational driving force of the rotor while reducing the speed,
an output shaft that outputs the rotational driving force to the outside, and
a case;

the stator has
a core comprising a magnetic body,
an insulating member that covers the core,
a winding that is wound on the insulating member, and
a conductive member for supplying drive power to the winding;

wherein the core includes a circular portion and a plurality of poles extending from the circular portion in the radial direction of the circular portion and formed along the circumferential direction of the circular portion;

the conductive member comprises
a joining part that is in contact with the lower surface of the insulating member,
an insertion part that rises axially upward from one end of the joining part, and
a board connection part descending axially downward from the other end of the joining part;

the insulating member covers the circular portion and the pole teeth, has a penetrated part for penetration in the axial direction by the insertion part, and a receiving groove for receiving the joining part;

the penetrated part is provided in the vicinity of the circular portion between the pole teeth;

the receiving groove extends from the penetrated part to a peripheral edge of the insulating member;

the joining part is arranged in the receiving groove in which said other end of the joining part extends to the peripheral edge of the insulating member; and the insertion part is inserted into the penetrated part from below the insulating member, penetrates the penetrated part, and is electrically connected to the winding above the insulating member;

the stator is fixed in a stator retaining part that is provided on the case; and the board connection part and the circuit board are electrically connected by way of the through hole.

8. The motor actuator according to claim 7, wherein
the rotational support part is a bearing fixed to the case.

9. The motor actuator according to claim 7, wherein
the rotational support part is a shaft fixed to the case.

10. The motor actuator according to claim 7, wherein
the board connection part has a press-fitting part, the cross-sectional shape of which differs from other portions, and the board connection part is inserted into the through-hole and fixed by way of press-fitting.

* * * * *